US012350808B2

(12) United States Patent
Herdling et al.

(10) Patent No.: US 12,350,808 B2
(45) Date of Patent: Jul. 8, 2025

(54) POWER TOOL

(71) Applicant: BLACK & DECKER INC., New Britain, CT (US)

(72) Inventors: Andre Herdling, Lohrheim (DE); Heiko Langhammer, Idstein (DE); Rene Thieme, Riesa (DE)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/368,593

(22) Filed: Sep. 15, 2023

(65) Prior Publication Data

US 2024/0001524 A1 Jan. 4, 2024

Related U.S. Application Data

(63) Continuation of application No. PCT/EP2022/055454, filed on Mar. 3, 2022.

(30) Foreign Application Priority Data

Mar. 15, 2021 (GB) ..................................... 2103555

(51) Int. Cl.
*B25F 5/00* (2006.01)
*B25F 5/02* (2006.01)

(52) U.S. Cl.
CPC ................ *B25F 5/006* (2013.01); *B25F 5/02* (2013.01)

(58) Field of Classification Search
CPC .................................. B25F 5/006; B25F 5/02
See application file for complete search history.

(56) References Cited

U.S. PATENT DOCUMENTS

| | | | | |
|---|---|---|---|---|
| 11,027,349 | B2 * | 6/2021 | Ling | B25D 17/24 |
| 2006/0144602 | A1 | 7/2006 | Arich et al. | |
| 2011/0259938 | A1 | 10/2011 | Chien et al. | |
| 2017/0225316 | A1 * | 8/2017 | Iwakami | B25F 5/02 |
| 2019/0061132 | A1 * | 2/2019 | Mori | B23D 51/16 |
| 2020/0078918 | A1 * | 3/2020 | Yoshikane | B25F 5/026 |
| 2020/0316767 | A1 * | 10/2020 | Furusawa | B25F 5/02 |

FOREIGN PATENT DOCUMENTS

| | | | |
|---|---|---|---|
| CN | 211491288 | U | 9/2020 |
| DE | 202012012149 | U1 | 2/2013 |
| DE | 102017101992 | A1 | 8/2017 |
| EP | 1674212 | A1 | 6/2006 |
| EP | 2082846 | B1 | 10/2012 |
| KR | 1020080113622 | A | 12/2008 |

* cited by examiner

*Primary Examiner* — Eyamindae C Jallow
(74) *Attorney, Agent, or Firm* — Rhonda Barton

(57) ABSTRACT

A power tool including a primary housing and a motor assembly connectable to a cutting tool. The motor assembly is configured to drive the cutting tool. A secondary housing is mounted within the primary housing. At least one first dampening system is coupled between the primary housing and the motor assembly. At least one second dampening system is coupled between the primary housing and the secondary housing. The at least one first dampening system and the at least one second dampening system are configured to reduce vibrations in the secondary housing generated by the motor assembly.

26 Claims, 9 Drawing Sheets

POWER TOOL

BACKGROUND OF THE INVENTION

Field of the Invention

The present invention relates to a power tool. In particular the present invention relates to a power tool with a vibration dampening system.

Description of the Related Art

Some power tools are designed for robust tasks such as demolition, chipping, hammering, hammer drilling, or breaking. One such known power tool is a demolition hammer which includes a hammer assembly for driving a cutting tool of the demolition hammer. A problem with the demolition hammer and other similar power tools is that the operator and internal components can experience excessive vibrations. If the operator's hands are exposed to prolonged vibrations from the hammer assembly via the housing, then this may cause discomfort and become a problem for the operator to grip the power tool. Furthermore, some of the internal components in the power tool can be damaged due to the vibrations from the hammer assembly It is known that demolition hammers and other such power tool can comprise a vibration dampening system between the hammer assembly and the housing. This means that the housing and the handle experiences reduced vibrations from the hammer assembly. A problem with this is that an inexperienced operator may attempt to force the cutting tool into the workpiece rather than holding the power tool in position. This means that the tool may not engage the workpiece correctly. Furthermore, the force of the operator pressing on the power tool can cause the vibration dampening system to be completely compressed. This means than vibrations from the hammer assembly will then be transmitted to the handle and the internal components.

One known solution as shown in U.S. Pat. No. 8,925,169 is to provide the power tool with a thrust indicator. The thrust indicator is a clutch-type mechanism for a hand drill and prevents rotation of the drill bit when the hand drill is over pressed. A problem with this arrangement is that an inexperienced operator can ignore the thrust indicator by removing it from the hand drill. Additionally, when the thrust indicator becomes worn or broken, the internal components and the housing will still experience vibrations. Furthermore, the thrust indicator is arranged to isolate a rotating drill bit and is not suitable for a power tool with a reciprocating hammer assembly Another known solution is shown in US 2010/0314147 where a power tool includes mechanical damping of electromechanical and electronics elements. An electronic module is mounted on a vibration isolator. A problem with this arrangement is that the vibration isolator is only suitable for small handheld power tools. The vibration isolator will not isolate large shock forces experienced by a hammer assembly of a heavy-duty power tool e.g., when an inexperienced operator over presses on a demolition hammer.

Examples of the present disclosure aim to address the aforementioned problems.

SUMMARY OF THE INVENTION

According to an aspect of the present disclosure there is a power tool including a primary housing; a motor assembly connectable to a cutting tool, the motor assembly configured to drive the cutting tool; a secondary housing mounted within the primary housing; at least one first dampening system coupled between the primary housing and the motor assembly; and at least one second dampening system coupled between the primary housing and the secondary housing; wherein the at least one first dampening system and the at least one second dampening system are configured to reduce vibrations in the secondary housing generated by the motor assembly.

Optionally, the at least one vibration dampening system is configured to reduce vibrations in the secondary housing generated by the motor assembly when at least one first dampening system is inoperable.

Optionally, the at least one first dampening system and the at least one second dampening system are tuned to substantially the same vibration frequency.

Optionally, the at least one first dampening system is configured to move with respect to the primary housing along a longitudinal axis of the power tool.

Optionally, the at least one second dampening system is configured to move with respect to the secondary housing substantially parallel to a longitudinal axis of the power tool.

Optionally, the cutting tool is reciprocatable along a tool axis and the at least one first dampening system and the at least one second dampening system are configured to move in a direction substantially parallel with the tool axis.

Optionally, the secondary housing is mounted on a side of the primary housing.

Optionally, the secondary housing is configured to house at least one controller circuit configured to send control instructions to the motor-assembly.

Optionally, the secondary housing is a tray including the at least one controller circuit.

Optionally, the at least one second dampening system comprises a moveable bracket fixed to the secondary housing.

Optionally, the at least one second dampening system comprises a fixed bracket mounted to the primary housing and the moveable bracket is moveably mounted to the fixed bracket.

Optionally, the moveable bracket comprises at least one guide element arranged to limit the movement of the moveable bracket.

Optionally, the at least one guide element comprises a peg movable within a slot.

Optionally, the at least one second dampening system comprises at least one vibration dampening element coupled to the movable bracket.

Optionally, the at least one dampening element is a compression spring, a leaf spring, foam pad, rubber pad, and/or silicone pad.

Optionally, one or more components mounted on the secondary housing project towards the fixed bracket.

Optionally, at least one gripping handle is mounted to the primary housing.

Optionally, operation of the at least one second dampening system is independent of the operation of the first dampening system.

Optionally, the at least one first and/or the at least one second dampening systems are spring mass systems.

Optionally, the at least one first and/or the at least one second dampening systems are configured to reduce vibrations in the secondary housing generated by the motor assembly in three perpendicular directions.

Optionally, the at least one first and the at least one second dampening systems are a tuned mass damper system.

Optionally, the motor assembly is a motor driven hammer assembly.

Optionally, the power tool is a demolition hammer, hammer drill, rotary hammer or a chipping hammer.

According to another aspect, there is provided a compacting power tool including: a primary housing; a motor connectable to a reciprocating drive mechanism; a compacting foot driven by the reciprocating drive mechanism and configured to engage a surface to be compacted; a secondary housing mounted within the primary housing; and at least one dampening system coupled between the primary housing and the secondary housing; wherein the at least one dampening system is configured to reduce vibrations in the secondary housing generated by the reciprocating drive mechanism.

Optionally, the compacting power tool further comprises a handle mounted to the primary housing, wherein: the secondary housing is mounted to the handle; and the at least one dampening system comprises a first dampening system coupled between the primary housing and the handle and second dampening system coupled between the handle and the secondary housing.

Optionally, the compacting power tool further comprises a battery housing for removably receiving a battery pack, wherein the battery housing is mounted to the primary housing, wherein: the secondary housing is mounted to the battery housing; and the at least one dampening system comprises a first dampening system coupled between the primary housing and the battery housing, and second dampening system coupled between the battery housing and the secondary housing.

Optionally, the secondary housing is configured to house at least one controller circuit configured to send control instructions to the motor-assembly.

Optionally, the compacting power tool is a plate compactor, a rammer, a tamper or a soil compactor.

BRIEF DESCRIPTION OF THE DRAWINGS

Various other aspects and further examples are also described in the following detailed description and in the attached claims with reference to the accompanying drawings, in which:

DETAILED DESCRIPTION OF THE INVENTION

Figure 1:
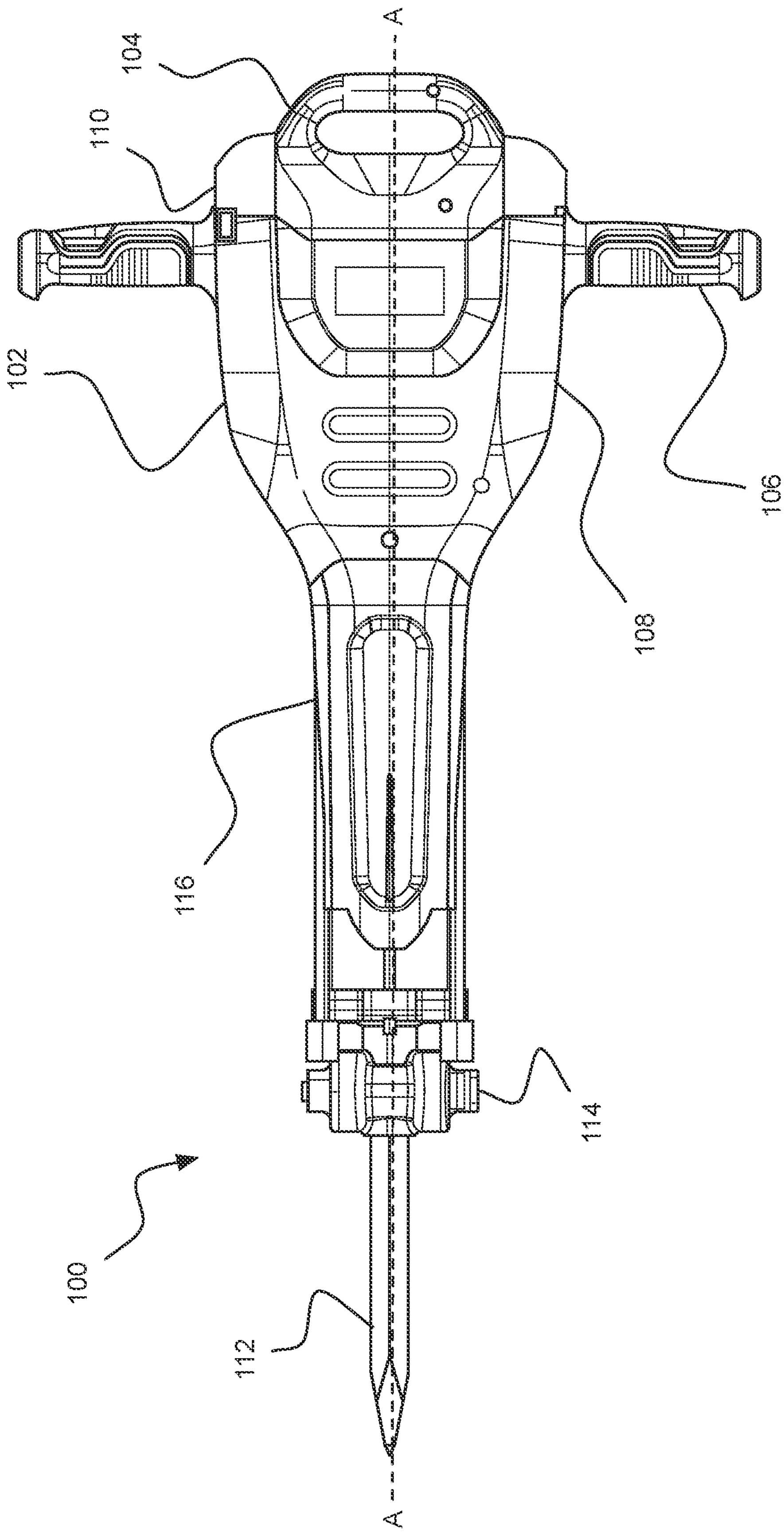
FIG. 1 shows a side view of a power tool according to an example.

FIG. 1 shows a side view of a power tool 100. The power tool 100 as shown in FIG. 1 is a demolition hammer. Whilst FIG. 1 shows a demolition hammer, in other examples any other type of power tool 100 can be used. For example, the power tool 100 can be a plunge saw, a reciprocating saw, a circular saw, an impact driver, a drill, a hammer drill, a multitool, an oscillating tool, a rotary hammer, a chipping hammer, a plate compactor, a rammer, a tamper, a soil compactor, a rammer, a pavement breaker or any other power tool which comprises electrical connections which experience vibration during operation of the power tool 100.

Figure 2:
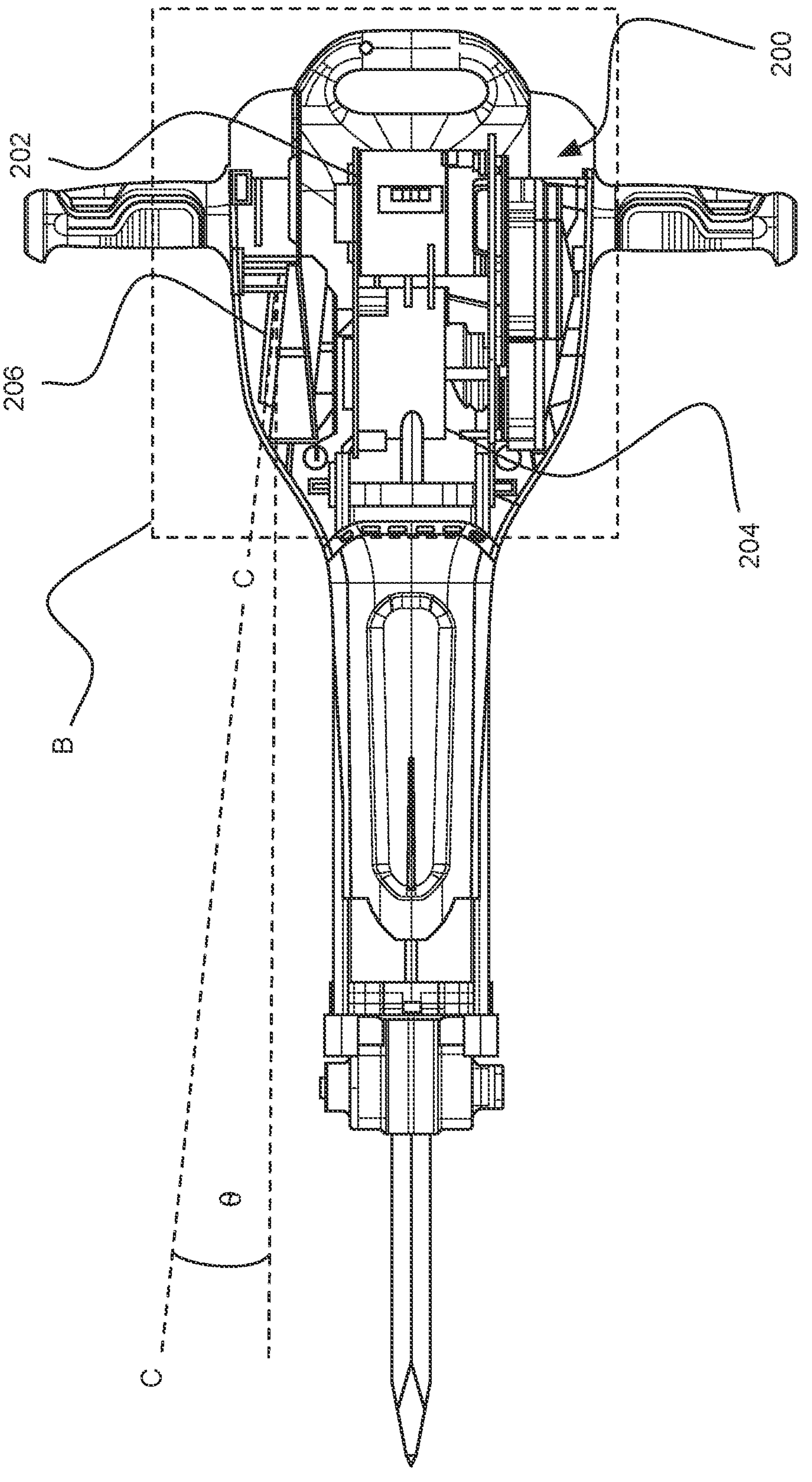
FIG. 2 shows a cross-sectional side view of a power tool according to an example.

The power tool 100 comprises a primary housing 102. The primary housing 102 comprises a clam shell type construction having two halves which are fastened together. For the purposes of clarity not all the primary housing 102 has been shown in FIGS. 1, 2 and 3. The halves of the primary housing 102 are fastened together with screws but in alternative examples any suitable means for fastening the primary housing 102 together may be used such as glue, clips, bolts and so on. For the purposes of clarity, the fastenings in the primary housing 102 are not shown in FIG. 1. The primary housing 102 can comprise a unitary element surrounding the internal components of the power tool 100. In other examples, the primary housing 102 can comprise one or more housing portions (not shown) which are mounted together to form the primary housing 102. The primary housing 102 can comprise one or more secondary housings 206 (as shown in FIG. 2). The secondary housing 206 is mounted within the primary housing 102 and protects one or more sensitive components. The secondary housing 206 will be described in more detail below.

As shown in FIG. 1, the primary housing 102 comprises a primary handle 104 and a secondary handle 106 for the user to grip during use. Optionally, the secondary handle 106 is mounted on a first side 108 of the primary housing 102 but alternatively the secondary handle 106 can be removeable and mounted on a second side 110 of the primary housing 102. A trigger button (not shown) is mounted on the primary handle 104 (or the secondary handle 106) which is used by the user to activate a motor assembly 200 (as shown in FIG. 2).

Reference will now be made to FIG. 2 which shows a cross-sectional side view of the power tool 100 according to an example. The motor assembly 200 is electrically connected to a battery pack (not shown) or a main electricity supply (not shown).

The motor assembly 200 comprises an electric motor 202 which is operatively coupled to a hammer assembly 204. The electric motor 202 and the hammer assembly 204 are mounted in the primary housing 102. The hammer assembly 204 is arranged to reciprocate along a longitudinal axis A-A of the power tool 100. The hammer assembly 204 is arranged to impart axial impacts onto a cutting tool 112 held in the tool holder 114. In some examples, the cutting tool 112 is a chisel bit for cutting stone, concrete or other hard surfaces. In other examples, the cutting tool 112 can be any other suitable cutting tool 112 for cutting, marking, breaking, drilling a workpiece (not shown) as required. The motor assembly 200, the electric motor 202 and the hammer assembly 204 are known components of a power tool 100 such as a demolition hammer and will not be discussed in any further detail. The cutting tool 112 comprises a longitudinal axis aligned with the longitudinal axis A-A of the power tool 100.

When the hammer assembly 204 impacts the tool holder 114 and the cutting tool 112, vibrations and shocks are created in the power tool 100. In order to prevent transmission of the vibrations to the primary housing 102 and the internal components of the power tool 100, the power tool 100 comprises a first vibration(s) dampening system 400 (best shown in FIG. 4) and at least one second vibration(s) dampening system 300 (best shown in FIG. 3).

Figure 3:
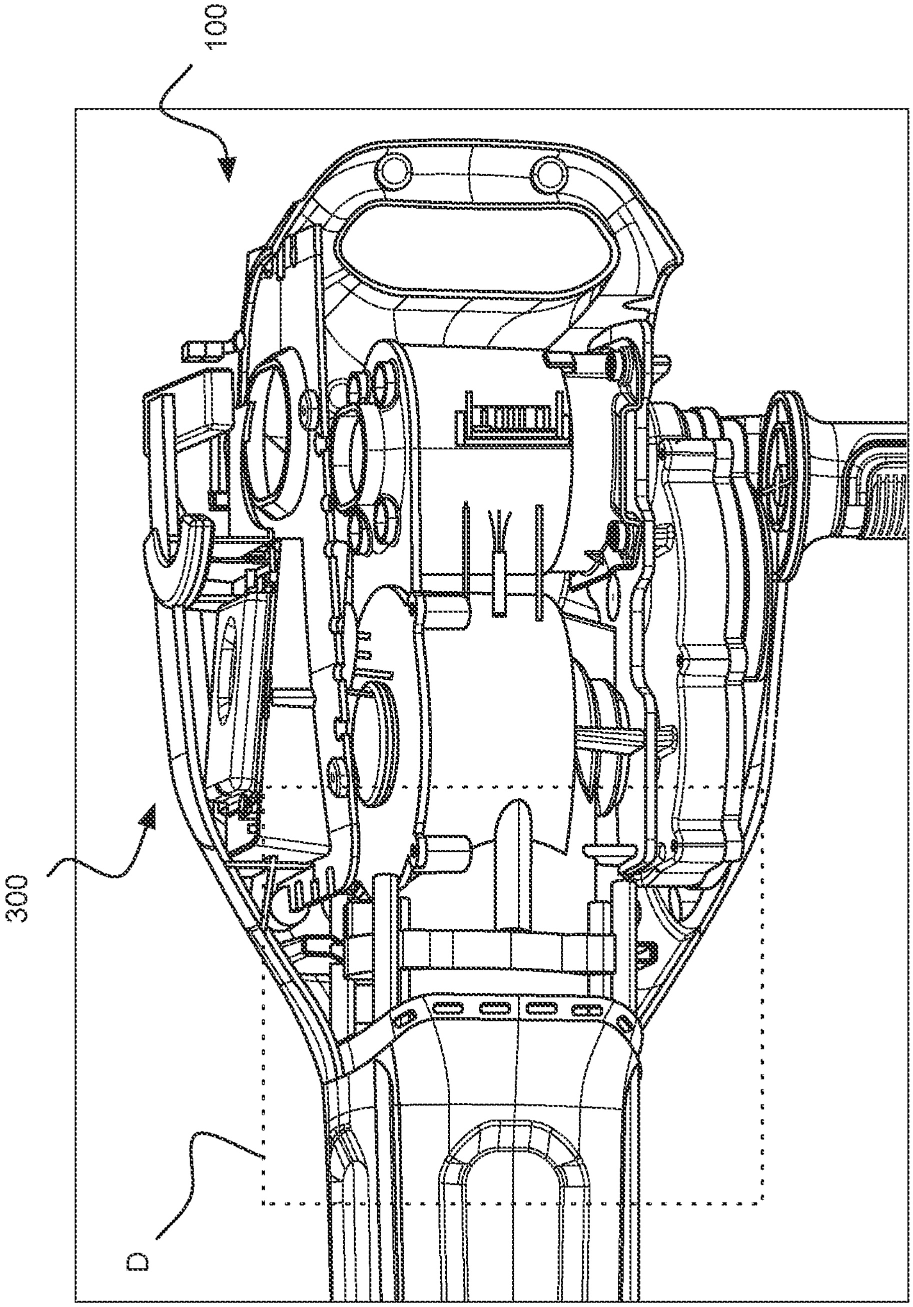
FIG. 3 shows a close-up cross-sectional side view of a power tool according to an example.
Figure 4:
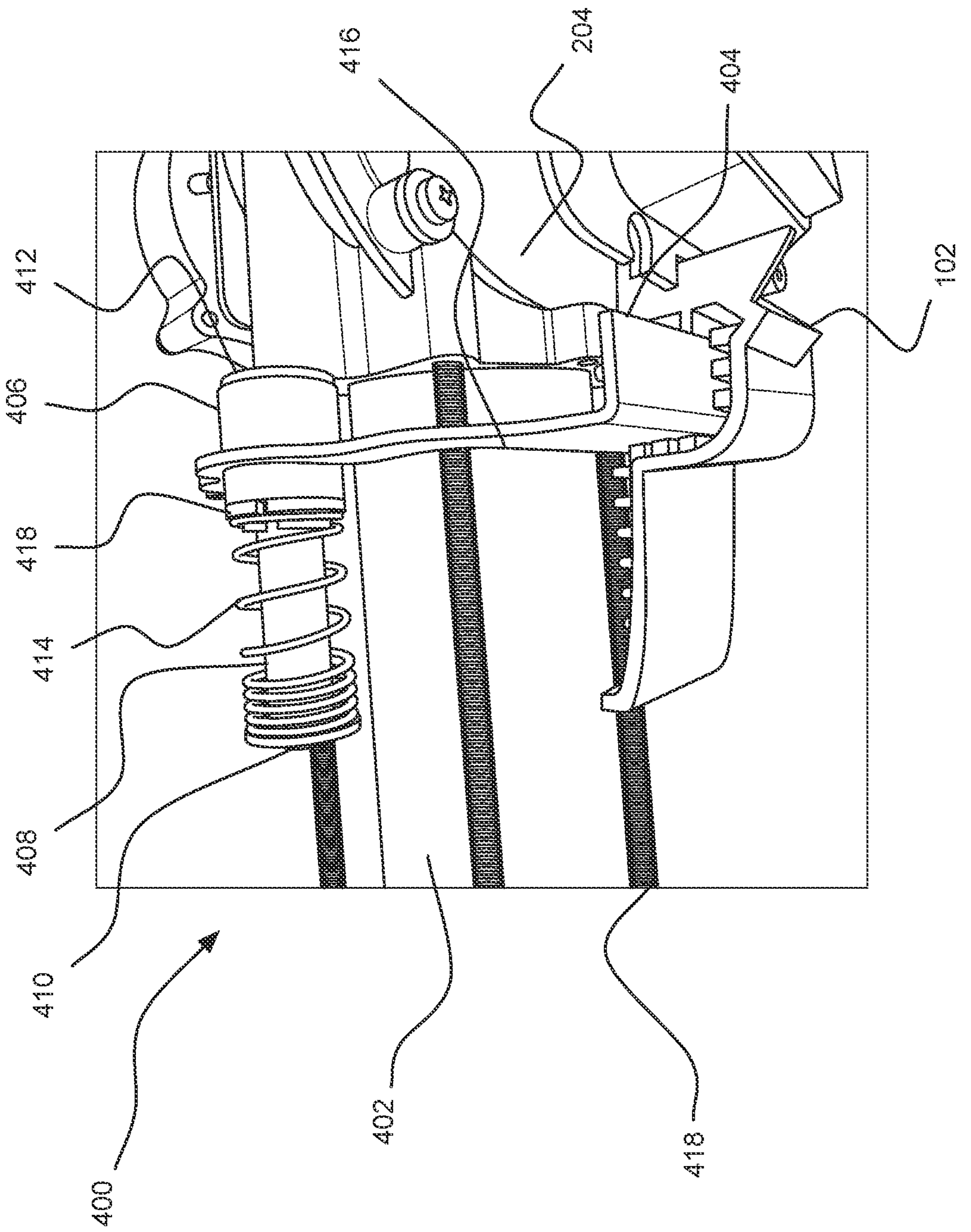
FIG. 4 shows another close-up cross-sectional side view of a power tool according to an example.

FIG. 3 shows a close-up cross-sectional side view of the power tool 100 according to an example. FIG. 3 is a side view of part of the power tool 100 located within the dotted box labelled B in FIG. 2. FIG. 4 shows another close-up cross-sectional side view of the power tool 100 according to an example. FIG. 4 is a side view of part of the power tool 100 located within the dotted box labelled D in FIG. 3.

The first vibration dampening system 400 will now be discussed in further detail with respect to FIG. 4. The primary housing 102 is partially cut away in FIG. 4 for the purposes of clarity. Specifically, a lower portion 116 (as shown in FIG. 1) of the primary housing 102 is not shown to reveal part of the motor assembly 200 e.g., the hammer assembly 204. A portion of the hammer assembly 204 is mounted within a hollow tube 402 and the hammer assembly 204 imparts axial impacts onto a cutting tool 112 within the hollow tube 402 as mentioned above. A plurality of fastening rods 418 (only one of the fastening rods 418 is labelled for clarity in FIG. 4) hold the hollow tube 402 in place with respect to the hammer assembly 204. In some other examples, the primary housing 102 does not comprise a lower portion 116 and does not cover the first vibration dampening system 400.

The first vibration dampening system 400 is coupled between the primary housing 102 and the motor assembly 200. In this way, the motor assembly 200 is decoupled from the primary housing 102 by virtue of the first vibration dampening system 400.

The primary housing 102 is mounted to a carrier plate 404. The carrier plate 404 is fixed to the primary housing 102 and moves together with the primary housing 102. The carrier plate 404 is fixed to the primary housing 102 via a plurality of fastenings (not shown). The carrier plate 404 in some examples is a steel plate but alternatively, the carrier plate 404 can be made from any other stiff and durable material.

The carrier plate 404 is fixed to a sleeve 406 mounted at one end of the first vibration dampening system 400. The sleeve 406 is threaded on a push rod 408 and the sleeve 406 is arranged to move along the push rod 408 when the hammer assembly 204 generates vibrations in operation. The carrier plate 404 comprises an opening 416 and the hollow tube 402 projects therethrough. The carrier plate 404, the sleeve 406 and the primary housing 102 move together with respect to the hollow tube 402 along a direction parallel with the longitudinal axis A-A when the first vibration dampening system 400 is operational.

The push rod 408 comprises a first flange 410 at a first end of the push rod 408 and a second flange 412 at a second end of the push rod 408. The sleeve 406 is mounted on the push rod 408 between the first flange 410 and the second flange 412. As shown in FIG. 4, the sleeve 406 abuts the second flange 412 however during use the sleeve 406 will move closer to the first flange 410 due to the weight of the power tool 100. In this way the sleeve 406 is permitted to move towards the first flange 410 and the second flange 412 as shocks and vibrations as transmitted from the hammer assembly 204.

In some examples the first vibration dampening system 400 comprises a compression spring 414 mounted around the push rod 408. The compression spring 414 is arranged to abut the first flange 410 and a shoulder portion 418 of the sleeve 406. Movement of the hammer assembly 204 causes the compression spring 414 to compress and the first vibration dampening system 400 absorbs at least some of the vibrations during operation. In some other examples, the compression spring 414 can be any other suitable component for dampening the vibrations and shocks.

FIG. 4 only shows a single first vibration dampening system 400 however in some examples there can be a plurality of first vibration dampening systems 400. In some examples, there can be two first vibration dampening systems 400 on the first side 108 and the second side 110 of the power tool 100. In other examples, there can be more first vibration dampening systems 400 e.g., three, four or more first vibration dampening systems 400.

Optimal performance of the power tool 100 is achieved when the power tool 100 is held in position, but not forced into a workpiece. A problem can occur when an inexperienced operator uses the power tool 100 and forces the power tool 100 towards the workpiece. By pushing the power tool 100 towards the workpiece, the power tool 100 is "overpressed". This means that the compression spring 414 of the first vibration dampening system 400 fully compressed and abuts the first flange 410 or the second flange 412. This means that the primary housing 102 and the first vibration dampening system 400 will move together with the hammer assembly 204. In other words, the hammer assembly 204 and the primary housing 102 are no longer decoupled by the first vibration dampening system 400.

In order to increase the resilience of the vibration dampening in the power tool 100, at least one second vibration dampening system 300 is coupled between the primary housing 102 and the secondary housing 206. This means that when the power tool 100 is overpressed, even though the first vibration dampening system 400 cannot absorb the vibrations, the at least one second vibration dampening system 300 is able to absorb vibrations and shocks generated by the hammer assembly 204 during operation. In this way the at least one second vibration dampening system 300 decouples the secondary housing 206 from the primary housing 102.

The secondary housing 206 will be discussed in further detail hereinafter. The primary housing 102 shields the internal components of the power tool 100. The power tool 100 comprises one or more secondary housings 206 for further protecting the internal components. The internal component may be a sensitive component such as electronics or circuit boards which are sensitive to shocks and vibrations. As shown in FIG. 2, a secondary housing 206 is mounted within the primary housing 102. FIG. 2 only shows a single secondary housing 206, however in other examples, there can be a plurality of secondary housings 206 providing additional protection for a plurality of different internal components.

The secondary housing 206 as shown in FIG. 2 is mounted in a plane C-C inclined at an angle θ to the longitudinal axis A-A of the power tool 100. In some examples, the angle θ of inclination of the plane is between 0 to 10 degrees. In other examples, the angle θ of inclination of the plane is 5 degrees. In other examples, the secondary housing 206 is substantially parallel with the longitudinal axis A-A of the power tool 100 and the angle θ of inclination of the plane C-C to the longitudinal axis A-A is 0 degrees.

In some examples secondary housing 206 as shown in FIG. 2 is mounted in a plane C-C inclined at an angle θ to the longitudinal axis A-A of the power tool 100 in order to provide room for the secondary hosing 206 in the primary housing 102.

Figure 5:
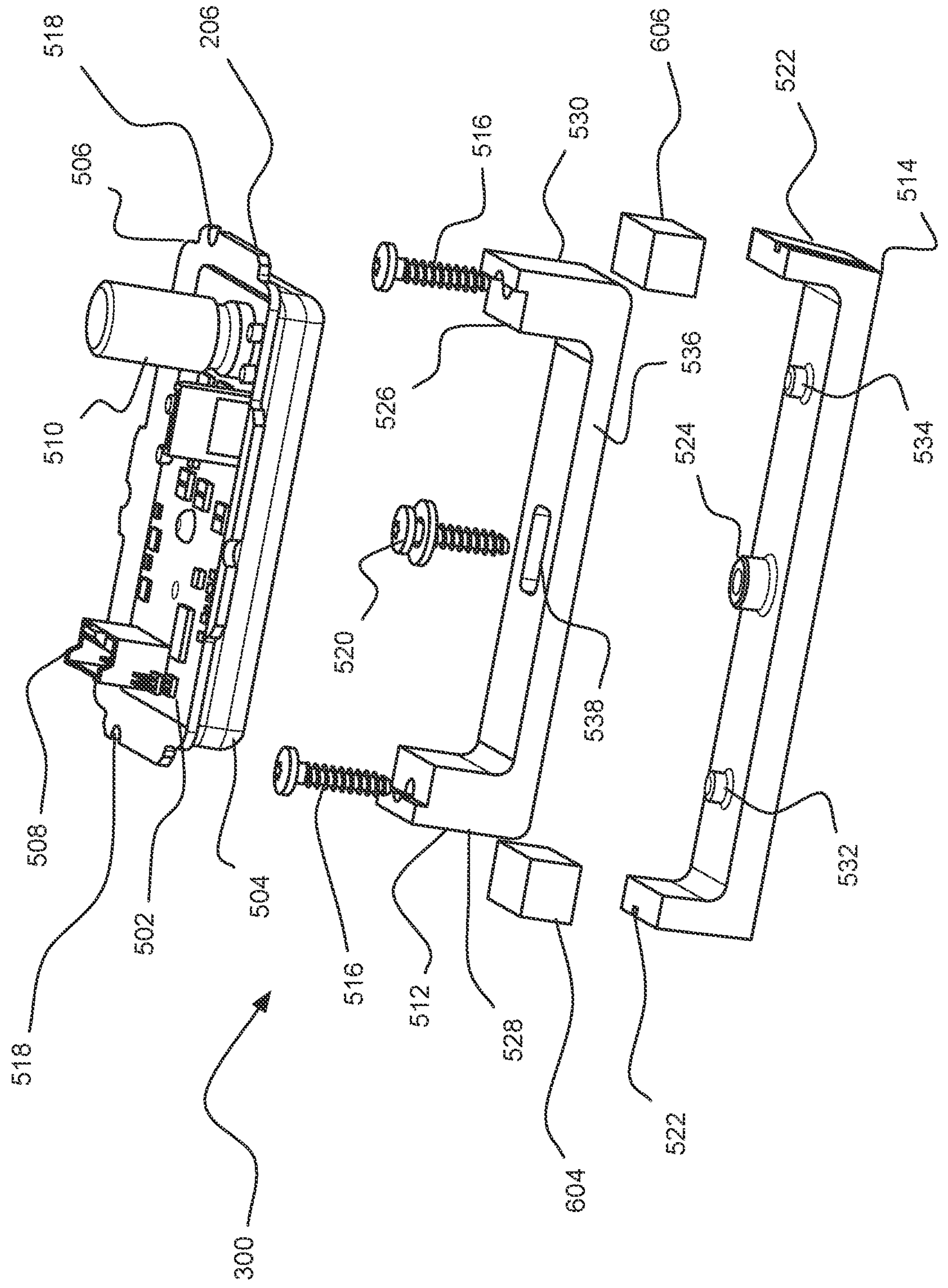
FIG. 5 shows an exploded perspective view of a vibration dampening system according to an example.

Furthermore, in some examples the second vibration dampening system 300 may optionally be a spring mass dampened system (not shown). In this example, the second vibration dampening system 300 comprises springs. In some examples, friction between the moveable bracket 512 and the fixed bracket 514 (as best shown in FIG. 5) is used as a damper alternative to a foam pad as discussed in reference to other examples. Accordingly, the angle of inclination θ between the plane C-C and the longitudinal axis A-A means that during every shock the moveable bracket 512 and the fixed bracket 514 are pressed together because of the acceleration and inertia of the power tool 100.

Figure 6:
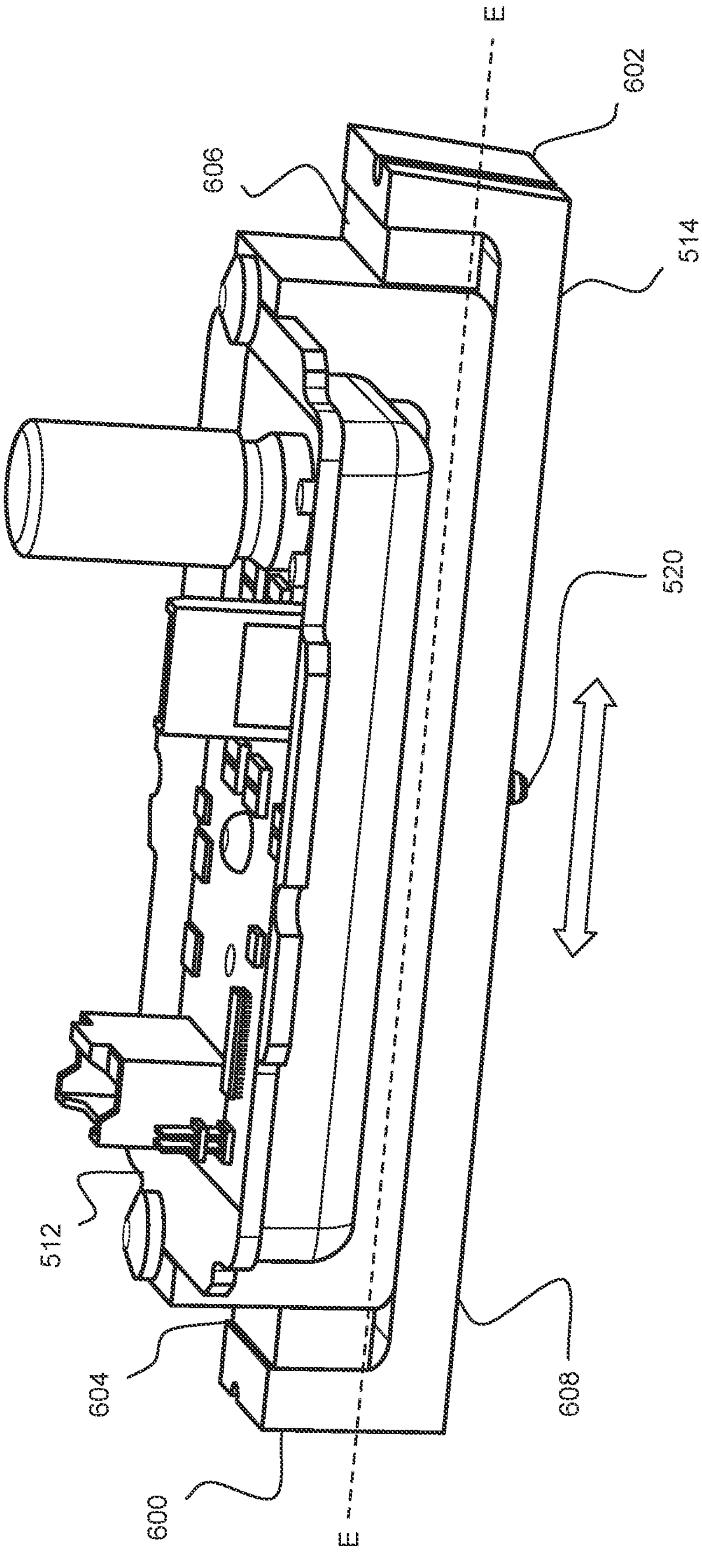
FIG. 6 shows a perspective view of a vibration dampening system according to an example.

However, in other examples as mentioned above, there is an angle of inclination θ of 0 degrees and a first and second vibration dampening elements 604, 606 (as shown in FIGS. 5 and 6) such as a foam pad is used.

Figure 7:
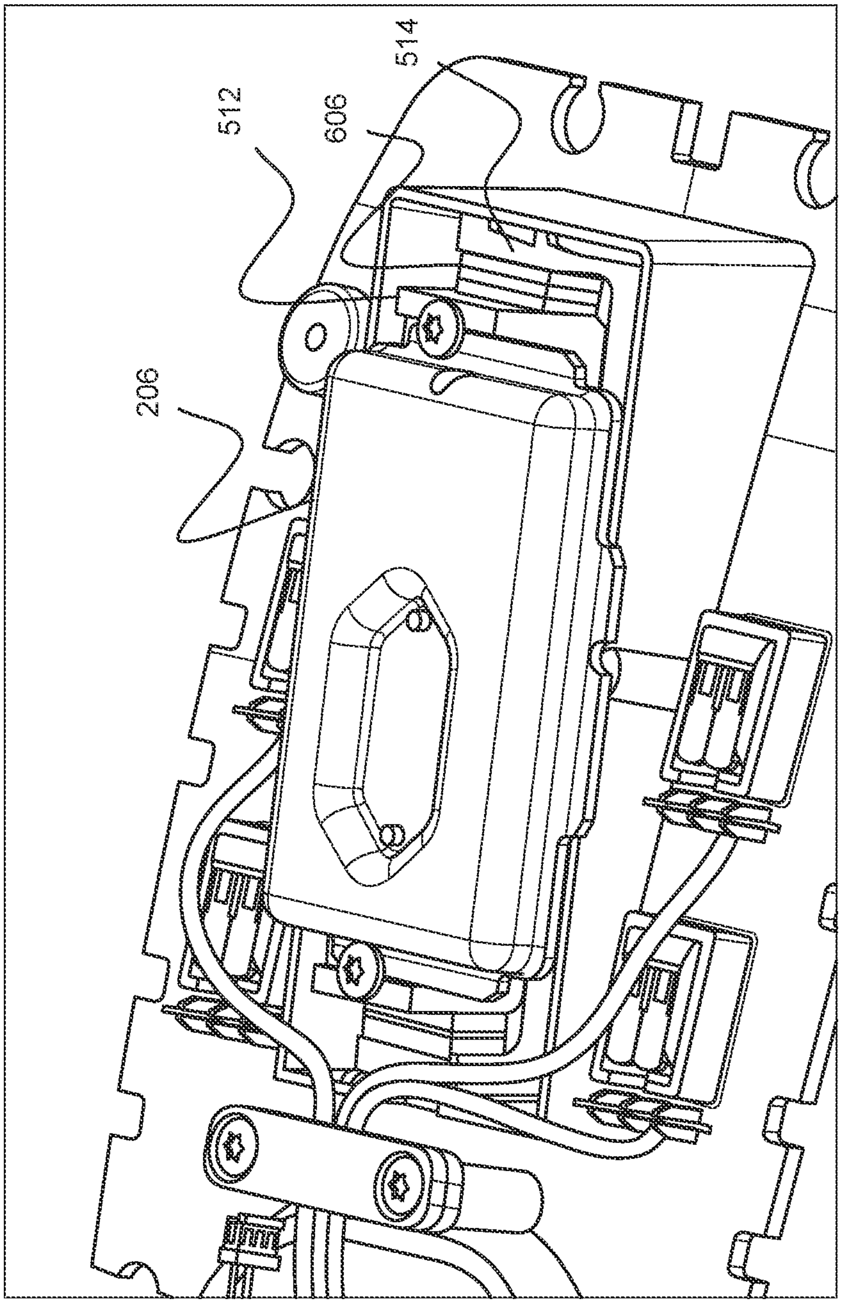
FIG. 7 shows a perspective view of a vibration dampening system according to an example.

The at least one second vibration dampening system 300 will now be discussed in reference to FIGS. 5, 6 and 7. FIG. 5 shows an exploded perspective view of the second vibration dampening system 300 according to an example. FIG. 6 shows a perspective view of the second vibration dampening system 300 according to an example. FIG. 7 shows a perspective view of the second vibration dampening system 300 according to an example.

In an embodiment, the secondary housing 206 as shown in FIG. 5 is a tray for receiving a printed circuit board (PCB) 502. The PCB 502 comprises a controller, which may be implemented by one or more components (such as a processor), for sending control instructions to the motor assembly 200. In other examples, the secondary housing 206 houses any other internal components which require shielding and protection from shocks and vibration. The tray comprises a side wall 504 and a lip 506. The side wall 504 encloses the PCB 502 and protects the edge of the PCB 502. The PCB 502 comprises one or more components such as connectors 508, capacitors 510 and other components that project out of the tray. Other internal components such as processors, memory, diodes, resistors etc can be mounted on the PCB 502. Whilst the secondary housing 206 as shown in FIG. 5 is a tray, the secondary housing 206 can be a fully enclosed housing. However, by providing a tray, one or more wires can be connected to the PCB 502 and allow for relative movement of the secondary housing 206 with respect to the primary housing 102. In some examples the secondary housing 206 is made from metal and is a heat sink for the PCB 502 and the electronic components mounted on the PCB 502.

The secondary housing 206 is mounted on the second vibration dampening system 300. The second vibration dampening system 300 comprises a first portion and a second portion wherein the first portion is moveable with respect to the second portion. In some examples, the second vibration dampening system 300 comprises a first portion which is a moveable bracket 512 and a second portion which is a fixed bracket 514.

The moveable bracket 512 comprises a first arm 528 and a second arm 530 for engaging with the secondary housing 206. The first arm 528 and the second arm 530 are connected by cross-piece 536. The first arm 528 and the second arm 530 project upwardly from the cross-piece 536. The first arm 528, the second arm 530 and the cross-piece 536 form a "U-shape".

The secondary housing 206 is mounted on the moveable bracket 512. In some examples, the lip 506 of the secondary housing 206 is clamped to the moveable bracket 512 via screw fastenings 516. In some examples, the lip 506 comprises notches 518 for aligning and receiving the screw fastenings 516. The lip 506 of the secondary housing 206 is located on a shoulder portion 526 on each of the first and second arms 528, 530. In some other examples, the secondary housing 206 is fixed to the moveable bracket 512 using any suitable fastening means such as glue, clamps, clips etc. In this way, the moveable bracket 512 and the secondary housing 206 are fixed together and move together. The moveable bracket 512 is decoupled from the fixed bracket 514 via first and second vibration dampening elements 604, 606. The first and second vibration dampening elements 604, 606 are discussed in further detail below with respect to FIG. 6.

The fixed bracket 514 of the second vibration dampening system 300 is mounted to the primary housing 102. The fixed bracket 514 is fixed to the primary housing 102 via a central screw fastening 520 (not shown). The fixed bracket 514 optionally comprises slots 522 at each end of the fixed bracket 514. The slots 522 are configured to engage with reciprocal ribs (not shown) on the primary housing 102. The slots 522 prevent the fixed bracket 514 from rotating about the central screw fastening 520.

The central screw fastening 520 is threaded through a linear slot 538 in the cross-piece 536 of the moveable bracket 512 and engages with a threaded bore 524 in the fixed bracket 514. Optionally the central screw fastening 520 extends through the threaded bore 524 and engages with a reciprocal threaded bore (not shown) in the primary housing 102. In other examples, the fixed bracket 514 is fixed to the primary housing 102 using any suitable fastening means such as glue, clamps, clips etc.

The linear slot 538 permits the moveable bracket 512 to slide with respect to the fixed bracket 514. Optionally, the second vibration dampening system 300 comprises one or more guide elements for guiding the relative movement between the moveable bracket 512 and the fixed bracket 514. In some examples, the fixed bracket 514 comprises a first peg 532 and a second peg 534 for projecting into reciprocal slots (not shown) on the underside surface of the moveable bracket 512. This means that the first and second pegs 532, 534 limit the movement of the moveable bracket 512 with respect to the fixed bracket 514 along the longitudinal axis E-E of the second vibration dampening system 300. The longitudinal axis E-E of the second vibration dampening system 300 is best shown in FIG. 6. The arrow in FIG. 6 illustrates the movement of the moveable bracket 512 with respect to the fixed bracket 514.

Similar to the moveable bracket 512, the fixed bracket 514 comprises a first arm 600 and a second arm 602 which are connected together via another cross-piece 608. The fixed bracket 514 also comprises a "U-shape". A first vibration dampening element 604 is mounted on the first arm 600 of the fixed bracket 514. A second vibration dampening element 606 is mounted on the second arm 602 of the fixed bracket 514. The first and second vibration dampening elements 604, 606 are mounted between the moveable bracket 512 and the fixed bracket 514. In this way, the first and second vibration dampening elements 604, 606 limit the vibrations and the shocks transmitted from the fixed bracket 514 mounted on the primary housing 102 to the secondary housing 206 mounted on the moveable bracket 512.

As shown in FIG. 6, the first and second vibration dampening elements 604, 606 are in contact with both the fixed bracket 514 and the moveable bracket 512 at the same time. This means that any relative movement of the moveable bracket 512 with respect to the fixed bracket 514 is cushioned by the first and second vibration dampening elements 604, 606.

In some examples, the first and second vibration dampening elements 604, 606 are one or more of a compression spring, a leaf spring, a soft pad, a foam pad, a rubber pad, silicone pad or any other suitable resiliently deformable material or component for absorbing shocks and vibrations from the hammer assembly 204. In some examples the first and second vibration dampening elements 604, 606 can be a resiliently deformable spring element integral with the moveable bracket 512 and/or the fixed bracket 514. For example, first and second vibration dampening elements 604, 606 are integral plastic spring elements with the moveable bracket 512 and/or the fixed bracket 514.

The secondary housing 206 as shown in FIGS. 5 and 6 is arranged so that one or more tall components project away from the moveable bracket 512 and the fixed bracket 514.

Alternatively, the secondary housing 206 can be mounted on the moveable bracket 512 so that the PCB 502 faces the moveable bracket 512 and the fixed bracket 514 as shown in FIG. 7. The arrangement as shown in FIG. 7 provides a more compact arrangement.

In some examples, the one or more components such as capacitors 510 and connections 508 are mounted on the secondary housing 206 such that they project towards the fixed bracket 514. In this arrangement the tall components such as the capacitors 510 and connections 508 are arranged on the PCB 502 such that they projected downwardly on one or either side of the fixed bracket 514. This means that when the secondary housing 206 and the moveable bracket 512 move relative to the fixed bracket 514, the tall components do not collide with the fixed bracket 514.

Figure 8:
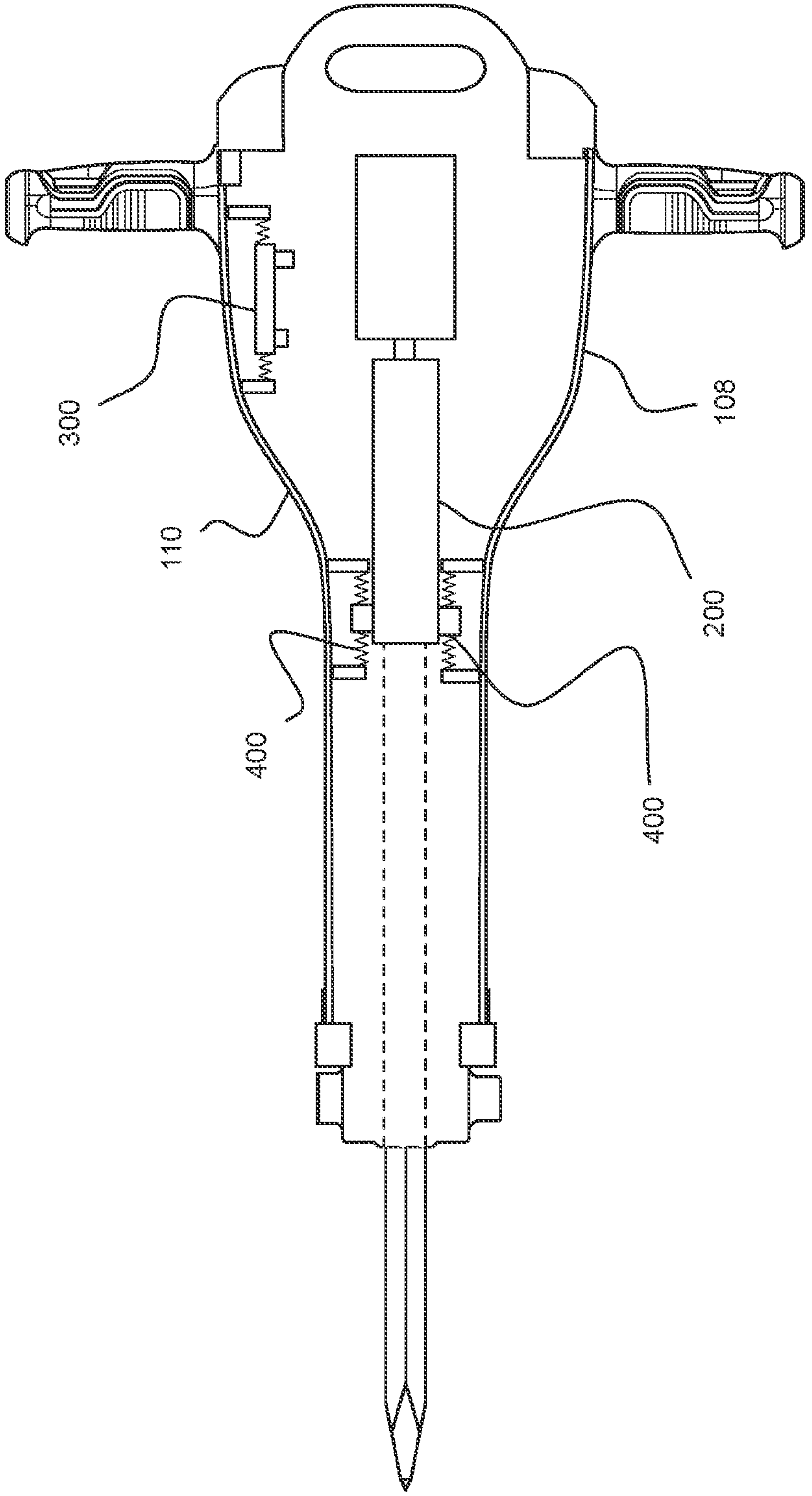
FIG. 8 shows a schematic side view of a power tool according to an example.
Figure 9:
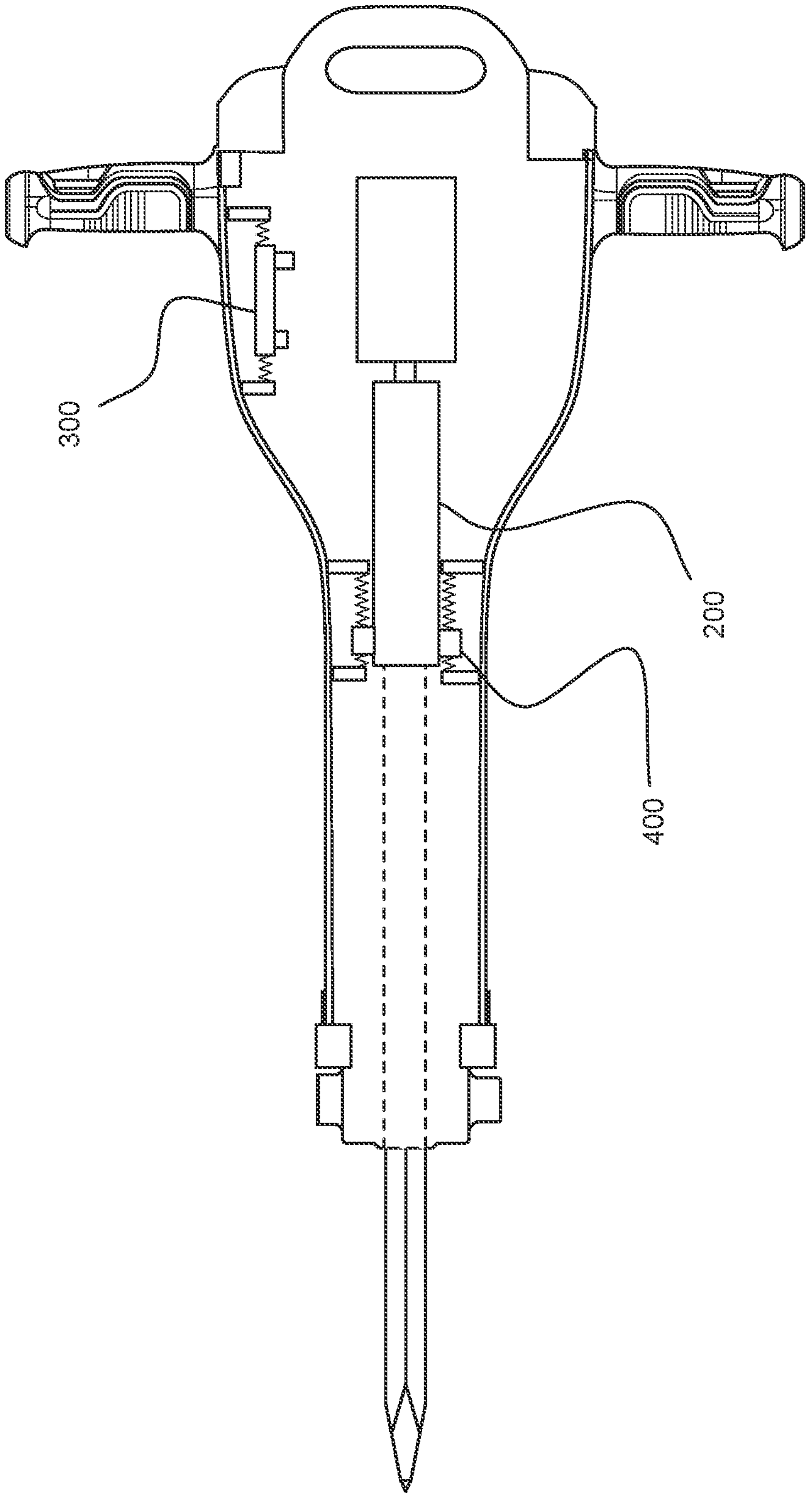
FIG. 9 shows a schematic side view of a power tool according to an example.

The second vibration dampening system 300 will now be discussed in further detail with respect to FIGS. 8 and 9. FIG. 8 shows a schematic side view of the power tool 100 according to an example in normal operation. FIG. 9 shows a schematic side view of the power tool 100 according to an example when the power tool 100 is "overpressed".

The first vibration dampening system 400 and the second the at least one second vibration dampening system 300 are independent of each other during operation. That is, operation of the first vibration dampening system 400 is independent of operation of the at least one second vibration dampening system 300. This allows for redundancy in the vibration dampening of the power tool 100. For example, if the first vibration dampening system 400 malfunctions or is inoperable (either via operator error e.g., overpressing or breaking), then the second vibration dampening system 300 is able to limit vibrations received at the secondary housing 206. This means that the secondary housing 206 is decoupled from the hammer assembly 204 via both the first vibration dampening system 400 and the second vibration dampening system 300.

FIG. 9 shows a scenario whereby the first vibration dampening system 400 has been overpressed and can no longer dampen the vibrations. The primary housing 102 is not decoupled from the hammer assembly 204 in the arrangement shown in FIG. 9. For example, the compression spring 414 has been fully compressed by the sleeve 406 due to the operator overpressing the power tool 100.

In some examples, the first vibration dampening system 400 and the at least one second vibration dampening system 300 are a tuned mass damper system. Advantageously, this means that all the vibrations can be absorbed by the first vibration dampening system 400 and the at least one second vibration dampening system 300 moving together in combination. This means that the at least one second vibration dampening system 300 can house sensitive electronics without being destroyed by the vibrations experienced from the power tool 100.

Nevertheless, this means that whilst the primary housing 102 can still experience vibrations from the hammer assembly 204, the secondary housing 206 remains decoupled from the primary housing 102 and the hammer assembly 204 via the second vibration dampening system 300. Accordingly, the secondary housing 206 and the PCB 502 mounted thereon is still protected from the vibrations and shocks.

In some examples, the first vibration dampening system 400 and the second vibration dampening system 300 are tuned to the same vibration frequency. This means that both the first vibration dampening system 400 and the second vibration dampening system 300 will have similar vibration dampening characteristics. This means that the second vibration dampening system 300 avoids experiencing a resonant frequency during operation.

In some examples, the first vibration dampening system 400 is configured to move with respect to the primary housing 102 along a longitudinal axis A-A of the power tool 100. The second vibration dampening system 300 is configured to move with respect to the secondary housing 206 substantially along a longitudinal axis A-A of the power tool 100.

In some examples, the cutting tool 112 is reciprocates along a tool axis. The tool axis is parallel with the longitudinal axis A-A of the power tool 100. The first vibration dampening system 400 and the at least one second vibration dampening system 300 are configured to move in a direction parallel with the tool axis.

In some examples, the secondary housing 206 is mounted on the first side 108, or the second side 110 of the primary housing 102.

Another example of a power tool is a compacting power tool (not shown) such as a rammer, plate compactor, soil compactor or tamper. Such compacting power tools are designed for robust tasks such as compacting soil, asphalt or hardcore. A rammer, for example, comprises a reciprocating foot which impacts and flattens the surface to be compacted. A problem with the rammer and other similar soil compacting power tools is that the internal components can experience excessive vibrations during operation. The dampening system described above in relation to the demolition hammer can also be applied to compacting power tools. For example, a rammer has a primary housing that comprises a motor which is coupled to a reciprocating drive mechanism which causes a compacting foot to reciprocate. The reciprocating drive mechanism for a rammer, for example, comprises an eccentric drive wheel which, via a connecting rod, moves a rod or piston up and down. The piston is coupled to a spring assembly which has an upper spring and a lower spring is arranged in a leg portion of the rammer. The upper and lower springs are arranged in line with the rod and connected to the leg portion of the tool. The oscillating movement of the piston causes the upper and lower springs to alternately expand and compress. As a result, the leg portion, together with the compacting foot, can be set in an oscillating upward and downward movement. The leg portion, the spring assembly and the compacting foot form a lower mass which oscillates relative to an upper mass formed by the remaining components of the rammer in the primary housing. In this way, the lower mass is decoupled from the upper mass. The primary housing comprises at least one secondary housing that protects one or more sensitive components, as described above. A vibration dampening system, such as vibration dampening system 300 described above, is coupled between the primary and secondary housings. This means that any vibrations or shocks that have not been dampened by the decoupled upper and lower masses can still be absorbed by the vibration dampening system and thus protect the sensitive components, such as the electronics module. In other embodiments, the primary housing may comprise a handle and/or a battery housing that removably receives a battery pack that provides power to the motor. The handle and/or the battery housing may be mounted to the primary housing via a first vibration dampening system (such as springs, torsional dampeners, etc). The secondary housing may be mounted to the handle or the battery housing via a second vibration dampening system, such as vibration dampening system 300 described above. This means that any vibrations or shocks that have not been dampened by the decoupled upper and lower masses and the first vibration dampening system can still be absorbed by the second vibration dampening system and thus protect the sensitive components, such as the electronics module.

In another embodiment two or more embodiments are combined. Features of one embodiment can be combined with features of other embodiments.

Embodiments of the present invention have been discussed with particular reference to the examples illustrated. However, it will be appreciated that variations and modifications may be made to the examples described within the scope of the invention.

The invention claimed is:

1. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein operation of the at least one second dampening system is independent of the operation of the at least one first dampening system.

2. A power tool according to claim 1, wherein the at least one first dampening system is configured to move with respect to the primary housing along a longitudinal axis of the power tool.

3. A power tool according to claim 1, wherein the at least one second dampening system is configured to move with respect to the secondary housing substantially parallel to a longitudinal axis of the power tool.

4. A power tool according to claim 1, wherein the cutting tool is configured to reciprocate along a tool axis and the at least one first dampening system and the at least one second dampening system are configured to move in a direction substantially parallel with the tool axis.

5. A power tool according to claim 1, wherein the at least one second dampening system comprises a moveable bracket fixed to the secondary housing.

6. A power tool according to claim 5, wherein the at least one second dampening system comprises a fixed bracket mounted to the primary housing and the moveable bracket is moveably mounted to the fixed bracket.

7. A power tool according to claim 6, wherein one or more components mounted on the secondary housing project towards the fixed bracket.

8. A power tool according to claim 5, wherein the moveable bracket comprises at least one guide element arranged to limit the movement of the moveable bracket.

9. A power tool according to claim 8, wherein the at least one guide element comprises a peg movable within a slot.

10. A power tool according to claim 5, wherein the at least one second dampening system comprises at least one vibration dampening element coupled to the movable bracket.

11. A power tool according to claim 10, wherein the at least one vibration dampening element comprises at least one of a compression spring, a leaf spring, foam pad, rubber pad, and a silicone pad.

12. A power tool according to claim 1, wherein at least one gripping handle is mounted to the primary housing.

13. A power tool according to claim 1, wherein at least one of the at least one first and the at least one second dampening systems are spring mass systems.

14. A power tool according to claim 1, wherein the motor assembly is a motor driven hammer assembly.

15. A power tool according to claim 1, wherein the power tool is a demolition hammer, hammer drill, rotary hammer or a chipping hammer.

16. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein the at least one second dampening system is configured to reduce vibrations in the secondary housing generated by the motor assembly when at least one first dampening system is inoperable.

17. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein the at least one first dampening system and the at least one second dampening system are tuned to substantially the same vibration frequency.

18. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein the secondary housing is mounted on a side of the primary housing.

19. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein the secondary housing is a tray comprising at least one controller circuit configured to send control instructions to the motor assembly.

20. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein at least one of the at least one first and the at least one second dampening systems are configured to reduce vibrations in the secondary housing generated by the motor assembly in three perpendicular directions.

21. A power tool comprising:

a primary housing;

a motor assembly connectable to a cutting tool, the motor assembly configured to drive the cutting tool;

a secondary housing mounted within the primary housing;

at least one first dampening system coupled between the primary housing and the motor assembly; and at least one second dampening system coupled between the primary housing and the secondary housing, wherein the at least one first dampening system and the at least one second dampening system are configured to reduce vibrations in the secondary housing generated by the motor assembly, and wherein the at least one first and the at least one second dampening systems are a tuned mass damper system.

22. A compacting power tool comprising:

a primary housing;

a motor connectable to a reciprocating drive mechanism;

a compacting foot driven by the reciprocating drive mechanism and configured to engage a surface to be compacted;

a secondary housing; and at least one dampening system coupled between the primary housing and the secondary housing;

wherein the at least one dampening system is configured to reduce vibrations in the secondary housing generated by the reciprocating drive mechanism.

23. A compacting power tool according to claim 22 further comprising a handle mounted to the primary housing, wherein the secondary housing is mounted to the handle, and wherein the at least one dampening system comprises a first dampening system coupled between the primary housing and the handle and a second dampening system coupled between the handle and the secondary housing.

24. A compacting power tool according to claim 22 further comprising a battery housing for removably receiving a battery pack, wherein the battery housing is mounted to the primary housing, wherein the secondary housing is mounted to the battery housing, and wherein the at least one dampening system comprises a first dampening system coupled between the primary housing and the battery housing and second dampening system coupled between the battery housing and the secondary housing.

25. A compacting power tool according to claim 22, wherein the secondary housing is configured to house at least one controller circuit configured to send control instructions to the motor assembly.

26. A compacting power tool according to claim 22, wherein the compacting power tool is a plate compactor, a rammer, a tamper or a soil compactor.

* * * * *